(12) United States Patent
Jurgensen et al.

(10) Patent No.: US 7,953,198 B2
(45) Date of Patent: *May 31, 2011

(54) FRAME SYNCHRONISATION SCHEME WITH INTERFERENCE REDUCTION

(75) Inventors: Juns-Uwe Jurgensen, Munich (DE); Richard Stirling-Gallacher, Esslingen (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/692,286

(22) Filed: Jan. 22, 2010

(65) Prior Publication Data

US 2010/0182993 A1 Jul. 22, 2010

Related U.S. Application Data

(63) Continuation of application No. 11/109,055, filed on Apr. 19, 2005, now Pat. No. 7,668,275.

(30) Foreign Application Priority Data

Apr. 21, 2004 (EP) .................................... 04009434

(51) Int. Cl.
*H04L 7/00* (2006.01)
(52) U.S. Cl. ...................................................... 375/365
(58) Field of Classification Search .......... 375/354–355; 370/350, 509, 512
See application file for complete search history.

(56) References Cited

U.S. PATENT DOCUMENTS

| | | | |
|---|---|---|---|
| 5,732,113 A | 3/1998 | Schmidl et al. | |
| 5,991,289 A * | 11/1999 | Huang et al. | 370/350 |
| 6,118,833 A | 9/2000 | Bergmans et al. | |
| 6,373,858 B1 | 4/2002 | Soleimani et al. | |
| 6,529,566 B1 | 3/2003 | Carsello et al. | |
| 6,928,048 B1 * | 8/2005 | Do et al. | 370/208 |
| 6,944,139 B1 | 9/2005 | Campanella | |
| 7,006,587 B1 | 2/2006 | Lewis et al. | |
| 7,061,976 B1 | 6/2006 | Petranovich | |
| 2001/0015988 A1 | 8/2001 | Sawada et al. | |
| 2002/0075797 A1 | 6/2002 | Kilani | |
| 2002/0110207 A1 * | 8/2002 | Jung | 375/354 |
| 2004/0071221 A1 * | 4/2004 | Nakada et al. | 375/260 |
| 2005/0117549 A1 * | 6/2005 | Kanterakis et al. | 370/335 |

FOREIGN PATENT DOCUMENTS

EP 1 049 302 11/2000

* cited by examiner

*Primary Examiner* — Khanh C Tran
(74) *Attorney, Agent, or Firm* — Oblon, Spivak, McClelland, Maier & Neustadt, L.L.P.

(57) ABSTRACT

A frame synchronization is proposed for a multi-band communication system, wherein a data signal exchanged between a transmitter and a receiver is organized in system frames having a preamble section which contains a frame synchronization section that is composed of a number of symbol frames, each of which is in turn composed of a defined number of slots, whereby each slot corresponds to an individual transmission frequency band. The method comprises steps for transmitting the data signal containing a synchronization signal in one or more slots of every other symbol frame of the frame synchronization section, processing only data signal components selected from transmission frequency bands required for the synchronization signal transmission, and subtracting the processed data signal from its shifted copy, whereby the copy is shifted by one symbol frame.

8 Claims, 3 Drawing Sheets

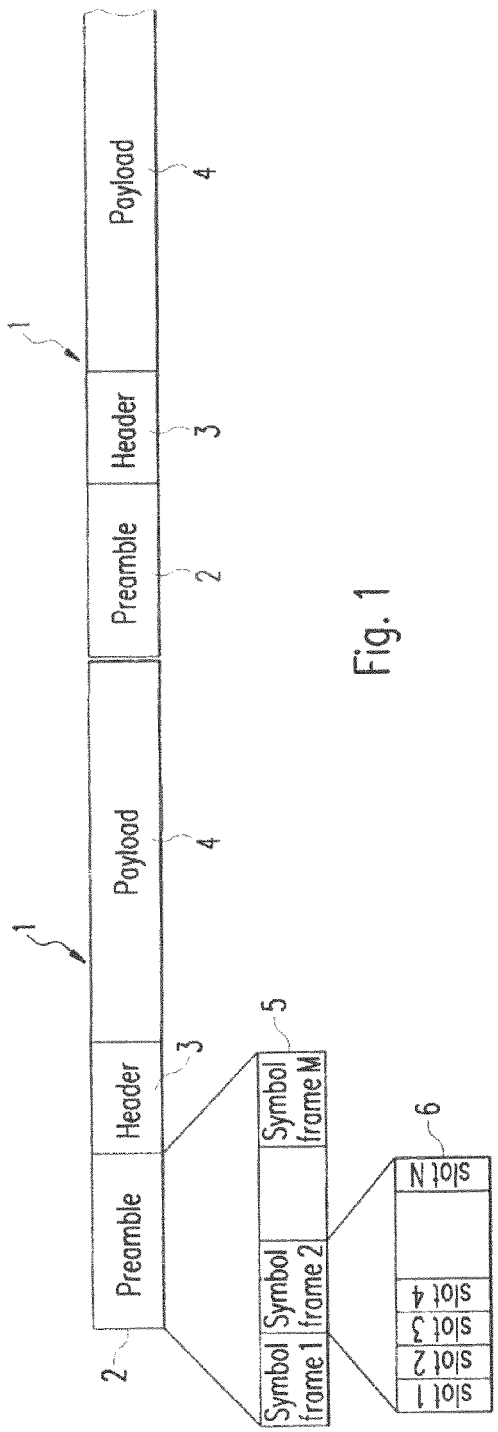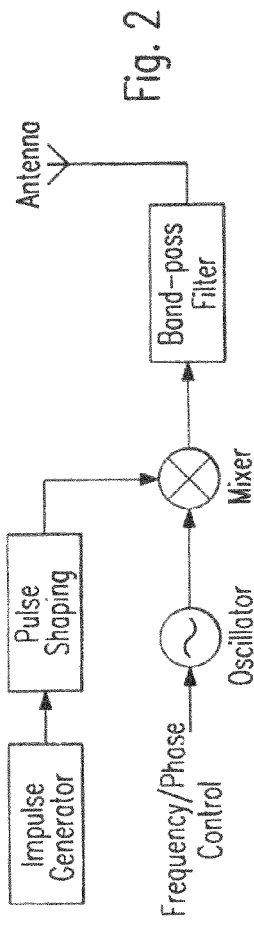

FRAME SYNCHRONISATION SCHEME WITH INTERFERENCE REDUCTION

Figure 4:
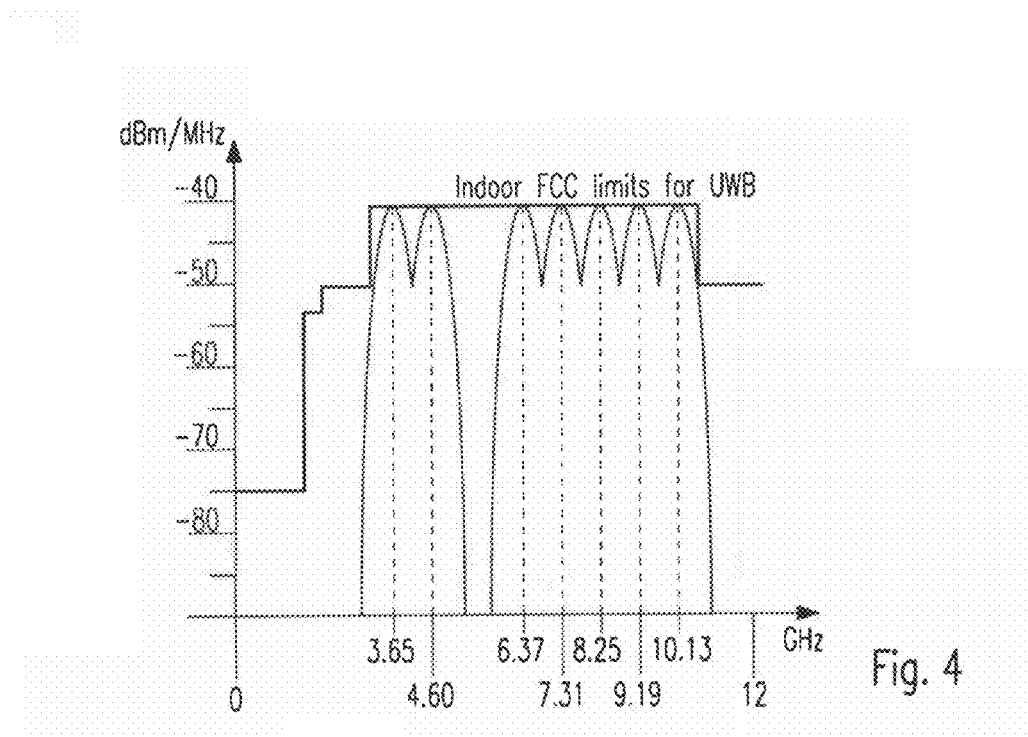

This application is a continuation application of U.S. application Ser. No. 11/109,055, filed Apr. 19, 2005 now U.S. Pat. No. 7,668,275, which is hereby incorporated by reference and is based upon and claims the benefit of priority from European Patent Application 04 009 434.4, filed Apr. 21, 2004.

The present invention relates to frame synchronisation in frame based communication systems, particularly in multi-band Wide Band or multi-band Ultra Wide-Band communication systems.

In a frame based communication system, data, which are exchanged between a transmitter and a receiver, are organised in so-called system frames. The preamble section in the system frame is used to synchronise the receiver to the transmitter by means of frame synchronisation. The preamble section, also simply referred to as preamble is composed of a number of symbol frames. The intention of a frame synchronisation is to identify the boundaries of the symbol frames within a preamble section.

The structure of a data stream or data signal in a frame based communication system is shown in FIG. 1. The data are organised in system frames, which are transmitted sequentially. Each system frame comprises a preamble section, a header section, and a payload section. Details hereto are e.g. described by Ellis, Siwiak, and Roberts in "P802.15.3a Alt PHY Selection Criteria", IEEE 802.15-03/031r5, Dec. 27, 2002. The preamble is used to synchronise the receiver to the transmitter as explained above, the header contains control data, and the payload section is used to transmit information data.

The preamble itself consists of a sequence of so-called symbol frames, which in turn are composed of a defined number of slots. A slot is reserved to receive an individual symbol element value so that symbols can be transmitted by the symbol frames on a slot-by-slot-basis. The symbols are then used by the receiver to accomplish the synchronisation. The synchronisation is typically done in two steps, frame timing and frequency correction. Frame timing identifies the symbol frame boundaries within the preamble while frequency correction adjusts the frequency of the receiver clock to the frequency of the transmitter clock. The transmitted signals are then detected after synchronisation.

Recently, intense attention has focused on Ultra Wide-Band (UWB) systems, which can offer very high data rates of more than 110 Mbps over a short range of about up to 10 m for broadband wireless applications including wireless multimedia stream or wireless video connection. UWB systems are systems, which use extremely large bandwidth. In the past, such systems were only used in military applications. However in 2002, the Federal Communications Commission (FCC) in the US allowed the use of the 3.1-10.6 GHz band for commercial ultra-wideband applications. The spectral requirements are specified in the paper of the Federal Communications Commission, "Revision of Part 15 of the Commission's Rules Regarding Ultra-Wideband Transmission Systems, First Report and Order", ET Docket 98-153, Apr. 22, 2002. Furthermore, the FCC defined that an ultra-wideband signal must occupy at least 500 MHz bandwidth or have a fractional bandwidth greater than 0.25. To generate such large bandwidth of up to 7.5 GHz, various methods exist including short pulse, chirp modulation, frequency hopping and the like.

Typical pulse generated ultra-wideband systems transmit a short pulse followed by a gap with no transmission until the next pulse is sent. The rate at which the pulses including the subsequent time gap between the pulses are sent is known as the pulse repetition frequency (PRF). If the pulses of such a UWB system occupy one very broad band (from 500 MHz up to 7.5 GHz), these systems are called Single Band UWB Systems. If the pulses occupy several smaller bands of more than 500 MHz, these systems are called Multi-Band UWB systems.

The block diagram of FIG. 2 shows an example for a multi-band UWB transmitter. An impulse generator provides impulses to a pulse-shaping filter, which is e.g. implemented using low-pass or band-pass filters. The output of a pulse-shaping filter is a pulse shaped impulse signal. The mixer up-converts the pulse shaped impulse signal to the desired operating frequency. The bandwidth of the UWB signal at the output of the mixer is determined by the bandwidth of the pulse-shaping filter. The centre frequency as well as the instantaneous phase of the UWB signal can be controlled via oscillator control. A RF band-pass filter is used at the output of the mixer to reject undesirable or out out-of-band frequencies and/or mixer products prior to a transmission via an antenna. A more detailed description of an UWB transmitter is e.g. given in U.S. Pat. No. 6,026,125.

The adjustable centre frequency of the oscillator depicted in FIG. 2 enables a multi-band UWB with frequency hopping. Frequency hopping patterns for multi-band UWB systems have been proposed by Discrete Time in "Discrete Time PHY Proposal for TG3a, IEEE802.15-03/099r1, March 2003", Philips in "Philips TG3a CFP Presentation, IEEE802.15-03/125r2, Mar. 2, 2003", Intel in "Intel CFP Presentation for a UWB PHY, IEEE802.15-03/109r1 Mar. 3, 2003", and General Atomics in "General Atomics Call for Proposal Presentation, UEEE802.15-03/105r1, Mar. 3, 2003" as part of the contributions for a UWB PHY to be developed in IEEE802.15-3a. Whereas Discrete Time and Intel propose using hopping patterns to avoid persistent collision of co-located uncoordinated piconets by using the pattern to differentiate the piconets, Philips and General Atomics propose using hopping patterns as information bearing signal, i.e. the pattern itself is used to encode data.

An example for the impulse response of the pulse-shaping filter in FIG. 2 is given by a Gaussian window. Mathematically the Gaussian window is defined as:

$$w(t) = e^{-\frac{t^2}{2\sigma^2}} \quad (1)$$

with t=0 being the centre of the pulse window and σ being the standard deviation.

To prepare a baseband signal for a transmission over a defined frequency band, the baseband signal is usually multiplied with a sine wave having a frequency that corresponds to the centre frequency of the frequency band. In a multi-band UWB-system, the sine wave is multiplied with a Gaussian window to result a pulse on the respective frequency band. The mixing itself is mathematically described by:

$$x(t)=s(t)\cdot w(t) \quad (2)$$

whereby s(t)=sin(2πft) and $$w(t) = e^{-\frac{t^2}{2\sigma^2}}.$$

x(t) is the signal at the output of the mixer, s(t) is the sine wave and w(t) is the same Gaussian window as defined in equation (1). In case of a fixed bandwidth, the standard deviation σ of the Gaussian window is the same for all frequencies f. In FIG. 3 three pulses with different centre frequencies $f_{low}$, $f_{medium}$, and $f_{high}$ are shown. These pulses can be observed between the mixer and the band-pass filter of FIG. 2. Since all of the three pulses have the same duration, all of them are occupying the same bandwidth at different frequencies. Those pulses with equal length are used in a system with frequency bands or sub-bands, respectively, of a fixed bandwidth.

Since the number of cycles per pulse is different for each pulse, the auto-correlation properties of the three pulses are different. FIG. 4 shows the spectrum of a multi-band UWB system with seven sub-bands of a fixed bandwidth. As can be seen, the roll off and the bandwidth of all sub-bands are the same.

Figure 5:
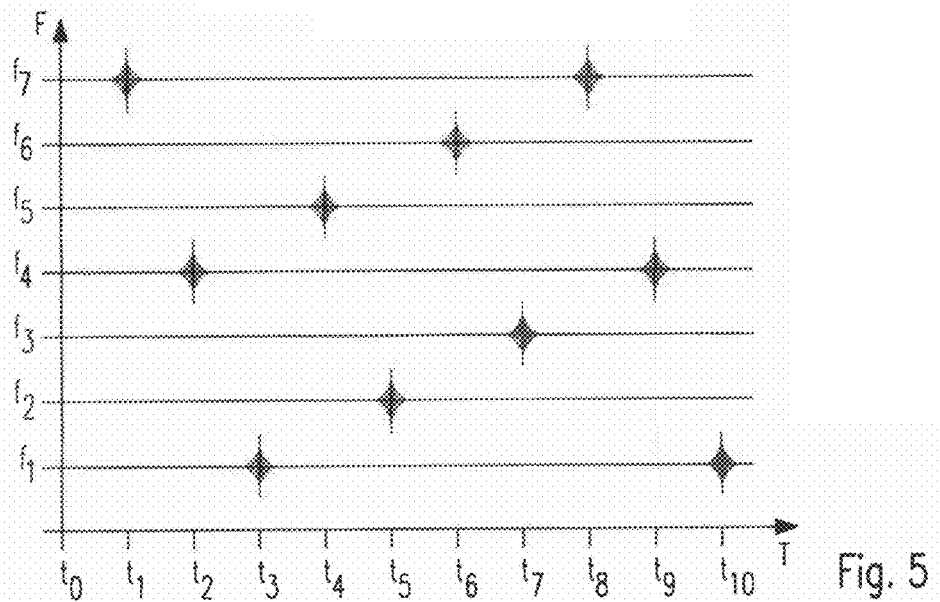

FIG. 5 shows an ordering of frequency sub-bands enabling reduced adjacent channel interference for multipath signal propagation conditions. Only one sub-band is used at a time by a pulse with the respective centre frequency. In the example shown, a symbol frame consists of seven slots, whereby each slot corresponds to one of the frequency bands defined by the respective sub-bands. Up to seven pulses have to be transmitted according to the example for transmitting a symbol in a symbol frame. Depending upon the modulation method used, a frequency band is reserved for the representation of only one single symbol element value or, when e.g. phase shift keying is additionally employed also for more than one single symbol element value. The order by which the frequency bands are used for sending the pulses is referred to as pulse transmission order. In the Example shown in FIG. 5, the pulse transmission order is defined as (7, 4, 1, 5, 2, 6, 3), which means that the seventh sub-band of centre frequency $f_7$ is used first, followed by the ones with the respective centre frequencies $f_4$, $f_1$, $f_5$, $f_6$, and finally $f_3$. Other pulse transmission orders may be used instead, whereby the communication system is less susceptible to interferences when the spectral distance between two frequency bands used subsequently according to the pulse transmission order is higher than that between two spectrally neighbouring frequency bands.

The frame timing can be identified via detection of the position of the different pulses or by detection of the position of one or more of the seven pulses. In both cases the pulse transmission order has to be known at the receiver. For avoiding interferences between co-located communication systems, each individual system is required to use a pre-defined pulse transmission order that is different to that of the others.

It is therefore an object of the present invention to provide a frame synchronisation that is less susceptible to interferences.

This object is achieved by a frame synchronisation based on a method for a multi-band communication system wherein a data signal exchanged between a transmitter and a receiver is organised in system frames having a preamble section, which contains a frame synchronisation section that is composed of a number of symbol frames, each of which is in turn composed of a defined number of slots, whereby each slot corresponds to an individual transmission frequency band. The method comprises steps for transmitting the data signal containing a synchronisation signal in one or more slots of every other symbol frame of the frame synchronisation section, processing only data signal components selected from transmission frequency bands required for the synchronisation signal transmission, and subtracting the processed data signal from its shifted copy, whereby the copy is shifted by one symbol frame.

The above object is further achieved by a transmitter for a frame based multi-band communication system, wherein a data signal to be transmitted is organised in system frames having a preamble section, which contains a frame synchronisation section that is composed of a number of symbol frames, each of which is in turn composed of a defined number of slots, whereby each slot corresponds to an individual transmission frequency band, and whereby the transmitter comprises a preamble control means for controlling the content of the preamble section such, that a synchronisation signal is modulated onto every other symbol frame of the frame synchronisation section.

The above object is also achieved by a receiver for a frame based multi-band communication system, wherein a received data signal is organised in system frames having a preamble section, which contains a frame synchronisation section that is composed of a number of symbol frames, each of which is in turn composed of a defined number of slots, whereby each slot corresponds to an individual transmission frequency band, and whereby the receiver comprises a down-conversion means for down-converting a data signal received, a shifting means for shifting a copy of the down-converted data-signal by one symbol frame, and a subtraction means for subtracting the down-converted signal from its shifted copy.

Instead of transmitting the synchronisation signals in every symbol frame, only every other symbol frame of the frame synchronisation section within the preamble is used for this purpose. By forming the difference of the processed data signal with its shifted copy, the synchronisation signal is available for all symbol frames in the frame synchronisation section of the preamble. The symbol frames, which contain no synchronisation signal, can advantageously be used for further purposes, particularly for estimating and reducing interferences thereby improving the performance of the preamble section with respect frame timing.

Advantageous embodiments of the present invention are the subject of the respective sub-claims.

In a first preferred embodiment of the present invention the copy of the processed data signal is shifted to the previous symbol frame, resulting practically in subtracting each of the symbol frames that contain no synchronisation-signal from their respective preceding symbol frames containing a synchronisation signal.

The processing of the data signal advantageously includes a transformation of the data signal components selected into a signal reflecting the power content of the data signal components. Thus, a further signal analysis is made independent of any phase shift induced effects. The transformation is effectively accomplished by a signal transformation means within the frame synchronisation unit of the receiver. The transformation is effectively achieved by summing up the squares of the in-phase and quadrature-phase components of the data signal.

For a convenient and easy to implement signal processing of the data signal, a further step for signal digitalisation is included, which is preferably accomplished by an analogue-to-digital converter within the frame synchronisation unit of the receiver.

By forming a signal representing the absolute value of the processed data signal subtracted from its shifted copy the processed synchronisation signal components are provided with the same sign for all symbol frames. Hereto an absolute value forming means may be provided in the frame synchronisation unit of the receiver.

Using a multi-band communication system wherein the data signal is a multi-band Wide-Band type of signal enables a frame synchronisation in piconets.

Figure 6:
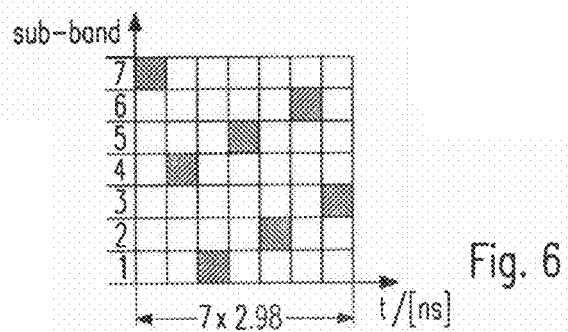
Figure 7:
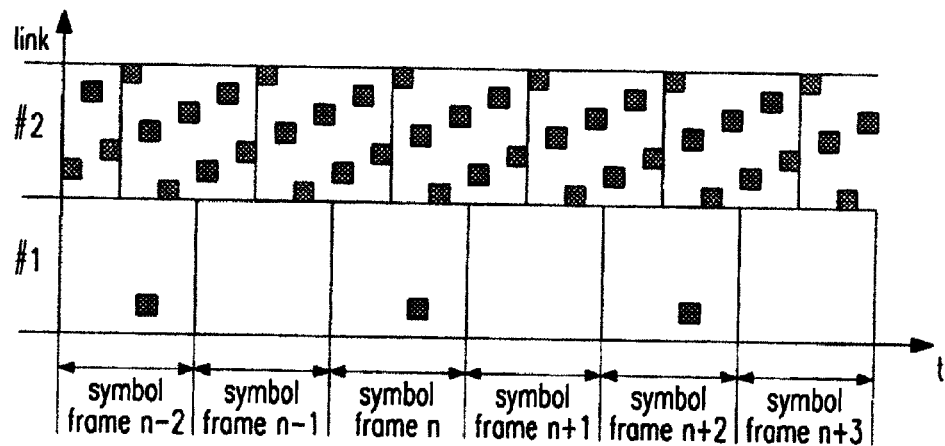
Figure 8:
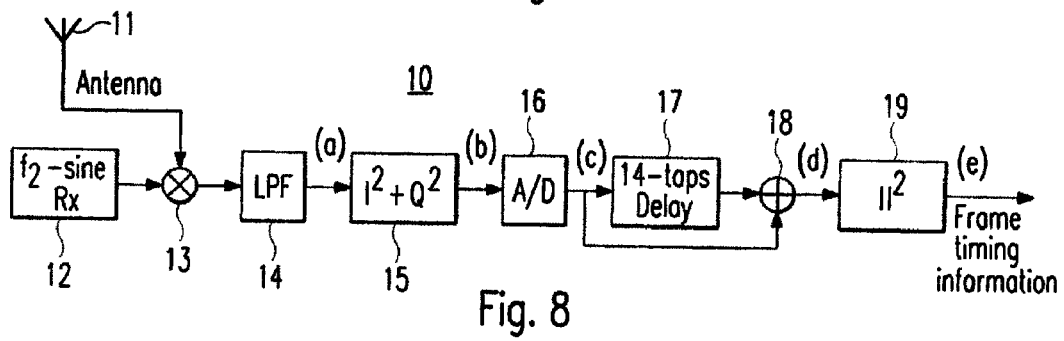
Figure 9:
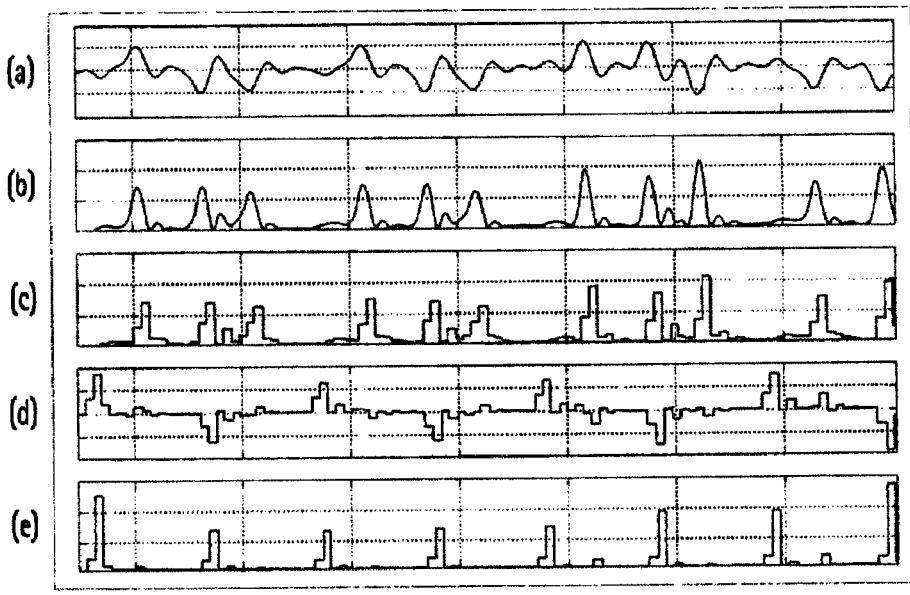

In the following description, the present invention is explained in more detail with respect to special embodiments and in relation to the enclosed drawings, in which FIG. 1 shows a data structure for a frame based communication system, FIG. 2 shows the principal components of a multi-band UWB transmitter in form of a block diagram, FIG. 3 shows pulses with identical bandwidth but different centre frequencies, FIG. 4 shows a spectrum of a fixed-bandwidth-7-sub-band UWB system, FIG. 5 shows the pulse staggering for a pulse transmission order (7, 4, 1, 5, 2, 6, 3), FIG. 6 shows the time-frequency grid for the pulse transmission order of FIG. 5, FIG. 7 shows the header or payload section of one communication link interfering with the preamble section of a further communication link, FIG. 8 shows the principal components of a multi-band UWB receiver according to the present invention in form of a block diagram, and FIG. 9 shows signal shapes at selected points of a receiver according to FIG. 8.

The data structure of a frame based communication system is shown in FIG. 1. A data signal prepared for transmission contains data organised in so-called system frames 1. Each system frame contains a preamble section 2, a header section 3, and a payload section 4. The preamble 2 is at least used to synchronise the receiver to the transmitter, the header 3 contains control data, and the payload section accommodates the information data. The preamble section 2 contains a frame synchronisation section which itself is composed of so-called symbol frames 5. Each of the symbol frames No. 1 to M of the preamble serves for a transmission of a symbol on a slot-by-slot basis, whereby a slot defines the smallest data unit, i.e. it can represent the value of just one symbol element.

Instead of transmitting a symbol in each symbol frame of the frame synchronisation part of the preamble, the present invention places a synchronisation symbol in every other symbol frame only, which then appears as a synchronisation signal located in one slot or distributed over more than one slot of the transmitted data signal. As a result, every second symbol frame contains no synchronisation related data and is therefore at disposal for other possible purposes, particularly for interference estimation and interference reduction purposes.

In the following, the present invention is explained with respect to a multi-band wideband communication system like the UWB system described above. The details of the invention are presented referring to a seven sub-band UWB communication system using the (7, 4, 1, 5, 2, 6, 3) sequence shown in FIG. 5 as pulse transmission order. But it is to be noted that the present invention is not bound to any particular type of pulse transmission order nor to the number of sub-bands available in a multi-band communication system. The pulse transmission order used for explaining the invention just forms an example.

The time-frequency grid shown in FIG. 6 indicates the sequential order of use for the seven sub-bands of the example. Each sub-band corresponds to a slot and is used only once within a symbol frame. The duration of a single slot in the example of FIG. 6 is 2.98 ns. By comparing FIG. 6 with FIG. 4 it can be seen, that the centre frequency of the frequency band used in the first slot is $f_7$=10.13 GHz. Correspondingly the centre frequency of the frequency band for the second slot is $f_4$=7.31 GHz, for the third slot $f_1$=3.65 GHz, the fourth slot $f_5$=8.25 GHz, the fifth slot $f_2$=4.60 GHz, the sixth slot $f_6$=9.19 GHz, and the seventh slot $f_3$=6.37 GHz. Symbols are modulated for transmission by up-converting the baseband signals representing the individual symbol element values on the sub-bands of the respective slots of a symbol frame. In a wideband communication system the baseband signal is a shaped pulse.

In the simplest case, a synchronisation symbol is chosen which modulated form yields a synchronisation signal occupying just one of the available sub-bands. As an example sub-band 2 is used, which is represented by the frequency band with a centre frequency $f_2$=4.60 GHz. Preferably, the synchronisation signal is thus formed by a pulse that is up-converted on sub-band 2 in every other symbol frame 5 of the preamble section 2.

On the receiver side, a respective data signal containing the synchronisation signal in every other symbol frame of the preambles is down-converted. For extracting the synchronisation symbol, only the sub-bands used for modulating the synchronisation symbol are down-converted. In the given example with the synchronisation signal being only present on sub-band 2, the down-conversion is limited to mixing the received data signal with a sine wave of frequency $f_2$=4.60 GHz followed by a lowpass filtering process. Thus, the synchronisation symbol or pulse(s) is (are) available with every second symbol frame of the preamble. To obtain a synchronisation symbol for each symbol frame of the preamble, a copy of the down-converted synchronisation signal is shifted by the length of one symbol frame. Practically this is achieved by delaying the signal copy by the duration of a symbol frame. The original synchronisation signal is then subtracted from its shifted copy, which leads to a negative synchronisation pulse for the symbol frames which originally contained a synchronisation symbol and to a positive pulse for the symbol frames to which no synchronisation symbol has been uploaded. The signs can be exchanged by exchanging the minuend with the subtrahend in the above-described subtraction. To obtain positive synchronisation pulses only, the difference signal is processed to result a signal representing its absolute values. This final processed signal is preferably used to determine the frame timing.

By leaving the symbol frames of the frame synchronisation section within the preamble that contain no synchronisation symbol blank, the frame synchronisation method according to the present invention can be effectively utilised for estimating and reducing interferences from a further communication link. FIG. 7 shows an example for two different communication links #1 and #2, whereby the header or payload section of link #2 interferes with the preamble section of link #1 at the receiver where a frame synchronisation is to be performed. for link #1 According to the present invention only every other symbol frame of the preamble contains a synchronisation symbol. The other symbol frames of the preamble are left blank.

The frame synchronisation unit 10 of a receiver according to the present invention is shown in FIG. 8. The data signals originating from communication link #1 and #2 are received by means of antenna 11. By mixing the interfering data signals with a sinusoidal signal of frequency $f_2$ in down-converter 13, the signal received by antenna 11 is down-converted with the mixing frequency $f_2$ provided by a local oscillator 12. A lowpass filter 14 at the output of the mixer 13 rejects signal components from sub-bands with higher centre frequencies or out out-of-band frequencies and/or mixer products. The resulting lowpass filtered signal contains the signal components of and around sub-band 2 from the data signals of both communication links #1 and #2.

The power of the signal is derived by an $I^2+Q^2$ calculation unit 15, which sums up the squares of the in-phase and quadrature-phase components of the down-converted and lowpass filtered data signal. After an analogue to digital conversion in A/D converter 16, the signal is splitted in two with one copy being shifted in the shifting unit 17 by one symbol frame, which in the current example corresponds to a delay of 14 taps of the A/D converter 16 with 2× oversampling or to a delay of 7 slots, respectively. The non-delayed copy is inverted and then added in the adder 18 to the delayed copy, which means that a subtraction is performed with the delayed copy forming the minuend and the non-delayed copy forming the subtrahend.

The down-converted $f_2$ pulse now shows up in every symbol frame of the preamble; with a positive sign for symbol frames which did not contain a synchronisation symbol an with a negative sign for symbol frames that where the carriers of a symbol frame. To obtain frame timing information in form of pulses having a positive sign only, the signal is supplied to an absolute value forming unit 19.

Usually, the order of the symbols in neighbouring symbol frames of the payload section of a system frame are the same from one frame to the next, which means that the content of adjacent symbol frames in these sections is somehow similar. Reducing the data signal to only the one or few sub-bands used for transmitting the synchronisation signal further enhances the likeliness between the contributions of adjacent symbol frames to the processed signal. By subtracting the down-converted data signal from its shifted copy according to the above explained, the interfering signal contribution to the current symbol frame is subtracted from the interfering signal contribution of the preceding frame. If both contributions a more or less alike, the difference signal is practically free of interferences.

FIG. 9 shows the signals observed (a) after the low pass filter of FIG. 8, (b) before and (c) after the A/D conversion, (d) after the subtraction process, and (e) after forming the absolute value signal. The original down-converted signal (a) contains the synchronisation signals of link #1, which are interfered by signal components of link #2 to an extent that makes any direct detection of the synchronisation pulses impossible. The power transformation results a clear representation of the synchronisation as well as of the interfering pulses in signal (b). But still it is not possible to determine the synchronisation pulses at this stage. The digitalisation stage allows a further processing of the signal with digital methods as e.g. used to implement the delay of one signal copy before forming the difference. Both digitalised copies still contain interfering signals as e.g. those pulses at above 60 ns or around 165 ns. After subtracting both copies from each other the interferences are practically gone as can be seen from signal (d). The said is even more apparent from the signal (e) when having undergone an absolute value formation.

For implementing a frame synchronisation according to the present invention, the transmitter of FIG. 2 has to be modified in addition to the receiver shown in FIG. 8. A transmitter according to the present invention is equipped with a preamble control unit that controls the content of the preamble section by controlling the impulse generator in accordance with the pulse transmission order such, that a synchronisation signal is modulated onto every other symbol frame of the preamble section of a system frame.

It is to be noted, that even though the invention is described with respect to a multi-band wideband and in particular to a multi-band UWB communication system, it is also applicable to any frame-based type of communication system, wherein the synchronisation is accomplished via the preamble, since no particular wideband features are required for implementing the introduced frame synchronisation.

What is claimed is:

1. A transmitter for a frame based multi-band communication system comprising:
    a data transmission device for transmitting a data signal organized in system frames having a preamble section which contains a frame synchronization section that is composed of a number of symbol frames, each of which is in turn composed of a defined number of slots, whereby each slot corresponds to an individual transmission frequency band,
    wherein the data signal contains a synchronization signal in one or more slots of every other symbol frame of the frame synchronization section.

2. The transmitter according to claim 1,
    wherein symbols are modulated for transmission by up-converting baseband signals representing individual symbol element values of the respective slots of a symbol frame.

3. The transmitter according to claim 2,
    wherein the baseband signal is a shaped pulse.

4. The transmitter according to claim 1, wherein just one slot of every other symbol frame of the frame synchronization section contains a synchronization signal.

5. A method of transmitting for a frame based multi-band communication system comprising:
    transmitting a data signal organized in system frames having a preamble section which contains a frame synchronization section that is composed of a number of symbol frames, each of which is in turn composed of a defined number of slots, whereby each slot corresponds to an individual transmission frequency band,
    wherein the data signal contains a synchronization signal in one or more slots of every other symbol frame of the frame synchronization section.

6. A method according to claim 5,
    wherein symbols are modulated for transmission by up-converting baseband signals representing individual symbol element values of the respective slots of a symbol frame.

7. A method according to claim 6,
    wherein the baseband signal is a shaped pulse.

8. A method according to claim 5,
    wherein just one slot of every other symbol frame of the frame synchronization section contains a synchronization signal.

* * * * *